United States Patent
Xie

(10) Patent No.: US 11,888,146 B2
(45) Date of Patent: Jan. 30, 2024

(54) ULTRA-HIGH SPECIFIC ENERGY CATHODE MATERIALS FOR LITHIUM-ION BATTERIES AND METHODS FOR PRODUCING THE SAME

(71) Applicant: The Trustees of Indiana University, Bloomington, IN (US)

(72) Inventor: Jian Xie, Zionsville, IN (US)

(73) Assignee: The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 18/252,247

(22) PCT Filed: Nov. 5, 2021

(86) PCT No.: PCT/US2021/058228
§ 371 (c)(1),
(2) Date: May 9, 2023

(87) PCT Pub. No.: WO2022/103661
PCT Pub. Date: May 19, 2022

(65) Prior Publication Data
US 2023/0327072 A1   Oct. 12, 2023

Related U.S. Application Data

(60) Provisional application No. 63/112,204, filed on Nov. 11, 2020.

(51) Int. Cl.
*H01M 4/04*     (2006.01)
*H01M 4/1393*   (2010.01)
(Continued)

(52) U.S. Cl.
CPC ............ *H01M 4/049* (2013.01); *B82Y 30/00* (2013.01); *H01M 4/1393* (2013.01);
(Continued)

(58) Field of Classification Search
CPC .... H01M 4/049; H01M 4/1393; H01M 4/364; H01M 4/5835; H01M 10/0525; H01M 2004/028; B82Y 30/00
(Continued)

(56) References Cited

U.S. PATENT DOCUMENTS

| | | | |
|---|---|---|---|
| 8,313,802 B2 | 11/2012 | Riman et al. | |
| 2015/0380732 A1* | 12/2015 | Xie | H01M 4/366 |
| | | | 427/126.3 |

(Continued)

FOREIGN PATENT DOCUMENTS

CN    105609731 A    5/2016

OTHER PUBLICATIONS

International Search Report; International Searching Authority; International Application No. PCT/US2021/058228; dated Mar. 9, 2022; 5 pages.

(Continued)

*Primary Examiner* — Gary D Harris
(74) *Attorney, Agent, or Firm* — Taft Stettinius & Hollister LLP

(57) ABSTRACT

Cathode active materials for lithium-ion batteries comprise a hybrid nanocomposite of graphene and copper fluoride. Such cathode active materials are used, together with a polymeric binder material and optionally a conductive additive to form a cathode for a lithium-ion battery. Methods of producing hybrid nanocomposites of graphene and copper fluoride include hydrothermally reacting functionalized graphene, such as graphene oxide, and precursors of copper fluoride, such as aqueous fluorosilicic acid. Such hydrothermal reactions include sequential heating and freeze drying steps to produce a $CuF_2$-graphene nanocomposite.

13 Claims, 7 Drawing Sheets

(51) Int. Cl.
| | |
|---|---|
| *H01M 4/583* | (2010.01) |
| *B82Y 30/00* | (2011.01) |
| *H01M 4/36* | (2006.01) |
| *H01M 10/0525* | (2010.01) |
| *H01M 4/02* | (2006.01) |

(52) U.S. Cl.
CPC ......... *H01M 4/364* (2013.01); *H01M 4/5835* (2013.01); *H01M 10/0525* (2013.01); *H01M 2004/028* (2013.01)

(58) Field of Classification Search
USPC ...................................................... 429/218.1
See application file for complete search history.

(56) References Cited

U.S. PATENT DOCUMENTS

| | | | |
|---|---|---|---|
| 2018/0212247 A1* | 7/2018 | Zhamu | ................ H01M 4/0497 |
| 2019/0267615 A1* | 8/2019 | Xie | ....................... H01M 4/483 |

OTHER PUBLICATIONS

Written Opinion of the International Searching Authority; International Searching Authority; International Application No. PCT/US2021/058228; dated Mar. 9, 2022; 6 pages.
Reva et al. "Alloying during Codeposition of Copper and Tin out of Silicoflouride Electrolytes." Russian Journal of Electrochemistry (2006), pp. 38-44; vol. 42, No. 1; http://doi.org/10.1134/s1023193506010071.

\* cited by examiner

ULTRA-HIGH SPECIFIC ENERGY CATHODE MATERIALS FOR LITHIUM-ION BATTERIES AND METHODS FOR PRODUCING THE SAME

CROSS REFERENCE TO RELATED APPLICATIONS

This application claims priority to U.S. Provisional Patent Application No. 63/112,204 filed on Nov. 11, 2020, which is incorporated by reference herein in its entirety.

FIELD OF THE DISCLOSURE

The present disclosure relates generally to cathode active materials for lithium-ion batteries and methods for producing same and, more particularly, to copper fluoride nanoparticles and graphene-enhanced copper fluoride nanocomposite materials.

BACKGROUND

Lithium-ion batteries are classes of electrochemical energy storage devices that comprise a cathode (positive electrode), an anode (negative electrode), and an electrolyte filling the space between the electrically insulated cathode and anode. In general, a porous separator is used to electrically separate the cathode from the anode. The electrolyte typically comprises a lithium salt dissolved in a non-aqueous (aprotic) organic solvent, which may be, for example, a linear carbonate, such as ethyl methyl carbonate, and/or a cyclic carbonate, such as ethylene carbonate.

Lithium ion batteries are used to provide electrical power to a wide range of devices that require power supplies with high specific capacity/energy, ranging from portable electronics (i.e. cellphone, iPad, laptop, etc.), medical devices (e.g. pacemakers, Holter monitor, remote patient monitoring systems, sensors etc.), transportation (e.g. electric vehicles (EVs) and hybrid electric vehicles (HEVs)), military equipment (i.e. unmanned underwater vehicles, radio, etc.) and many other applications. Lithium has the lowest density among all metals, 0.534 g·cm$^{-3}$ and has the most negative reduction potential, −3.05V (vs. standard hydrogen electrode potential). The low density and the negative potential give lithium metal the highest theoretical specific capacity, 3861 mAh g$^{-1}$ (compared to 372 mAh g$^{-1}$ of a carbon anode in lithium-ion batteries) while the negative potential allows the construction of a battery with high open-circuit voltage. This combination of high capacity, which is the capacity for storing Li$^+$ ions, and negative potential consequently leads to high energy density batteries.

The specific capacity and specific energy of a lithium-ion battery cell depends upon the materials used as the anode and the cathode. With the rapid development of portable electronics and EVs/HEVs, the demand for higher specific energy batteries has become increasingly urgent. In order to meet this demand, the development of new electrode materials has attracted substantial attention. As anode materials offer a higher Li-ion storage capacity (e.g. theoretical specific capacity of 372, 3860 and 4200 mAh/g for graphite, lithium metal and nanostructured Si, respectively) than do prior art cathode materials (e.g. theoretical specific capacity of 272 and 175 mAh/g for LiCoO$_2$ and LiFePO$_4$, respectively), the cathode material is the limiting factor in the performance of prior art Li-ion batteries. To achieve higher specific energy (Wh/kg), cathode materials need to have higher specific capacity (mAh/g). Additionally, the cathode materials are desired to have high potential (vs. Li/Li$^+$) because the specific energy is the product of cell voltage and specific capacity.

Developing high performance primary lithium-ion batteries with satisfactory energy density, wide operation temperature range, and acceptable cost is crucial for both military and civil applications[1]. High energy density of primary batteries has been listed as the first priority compared with rechargeable batteries. Lithium primary batteries with lithium metal anodes and various different cathode materials have been reported and/or commercialized such as, for example, Li—CF$_x$[2], Li—S[3], Li—SO$_2$[4], Li—SOCl$_2$[5], and Li—FeS$_2$[6], whose energy densities (based on whole battery) are summarized in FIG. 1. Of these, only the Li—SOCl$_2$ battery realizes an energy density larger than 600 Wh kg$^{-1}$; however, the severe toxicity and corrosivity of SOCl$_2$ leads to safety concerns, and further limits the application range of Li—SOCl$_2$ primary batteries. On the other hand, some alkaline based primary battery systems have been explored or commercialized to reduce the manufacturing costs. Examples of alkaline based primary batteries include, for example, Zn—AgO[7], Zn—MnO$_2$[8], and super-iron batteries (e.g. Zn—K$_2$FeO$_4$ and Zn—BaFeO$_4$)[9]. Despite the low cost, their energy densities are still unsatisfactory (FIG. 1, <500 Wh kg$^{-1}$). To pursue higher energy density, O$_2$ cathode-based primary battery systems (also referred to as "air cathode-based primary batteries") have received considerable attention. By eliminating the mass of cathode (O$_2$ from air), such primary batteries, examples of which include Li—O$_2$[10], Al—O$_2$[11], Mg—O$_2$[12], Zn—O$_2$[13], demonstrated ultra-high energy density (FIG. 1). Nevertheless, the sluggish kinetic of oxygen reduction reaction (ORR) requires extra catalysts to accelerate the reaction rate, which poses challenges for high-power density and further dramatically reduces the overall energy density of the whole cell. Moreover, the operations of these cells require O$_2$-rich atmosphere, which highly restricts the applications in which such batteries can be utilized, excluding, for example, many aerospace applications and uses in implanted medical devices.

A great need exists for development of high energy density (>600 Wh kg$^{-1}$) batteries suitable for wide application. In addition, a need exists for further improvements in the development of cathode-active materials having combinations of features suitable for inclusion in lithium-ion batteries, such as, for example, good electrochemical performance, including good diffusion coefficient and good electrical conductivity, and good structural stability. The present disclosure addresses these needs.

SUMMARY

In one aspect of the present disclosure, graphene is incorporated into the nanostructure of copper fluoride to provide a cathode-active material having a combination of properties useful for a lithium-ion battery. Various drawbacks have prevented widespread use of copper fluorides as cathode-active materials, and the combination of copper fluoride nanoparticles with graphene to provide a nanocomposite material according to the present disclosure allows for developing the next generation of battery materials for energy storage and other applications. By incorporating graphene into a hybrid nanocomposite material with copper fluoride, various desirable electrochemical and structural features have been observed, as described in this disclosure.

The present disclosure may comprise one or more of the following features and combinations thereof.

According to one aspect of the present disclosure, solution-based reactions, such as hydrothermal or solvothermal reactions are used to make nanoparticles and to make hybrid nanocomposite materials. In one embodiment, a method of solution-based reactions to produce a $CuF_2$-graphene nanocomposite may include (i) mixing a first quantity of $CuSiF_6 \cdot 6H_2O$ with a second quantity of graphene oxide in an aqueous graphene oxide solution to provide an aqueous mixture; (ii) heating the aqueous mixture to produce a $CuSiF_6$/graphene oxide material; (iii) freeze drying the $CuSiF_6$/graphene oxide material; and (iv) after said freeze drying, heating the $CuSiF_6$/graphene oxide material under air flow to produce a cathode active material comprising a $CuF_2$-graphene nanocomposite. The $CuSiF_6 \cdot 6H_2O$ may be prepared, for example, by mixing copper oxide powder with fluorosilicic acid aqueous solution to provide a dispersion, heating and stirring the dispersion to produce $CuSiF_6 \cdot 6H_2O$, and filtering the $CuSiF_6 \cdot 6H_2O$ to provide a $CuSiF_6 \cdot 6H_2O$ filtrate.

In one embodiment of the method, the first quantity and the second quantity are present in the aqueous mixture at a ratio of from about 25:1 to about 10:1, by weight. In another embodiment, the first quantity and the second quantity are present in the aqueous mixture at a ratio of about 18:1, by weight. In one embodiment of the method, heating the aqueous mixture comprises heating the aqueous mixture to a temperature of from about 160° C. to about 200° C. in another embodiment, the aqueous mixture is heated to a temperature of from about 160° C. to about 200° C. for at least 8 hours. In yet another embodiment, heating the aqueous mixture comprises heating the aqueous mixture to a temperature of about 180° C. for about 12 hours. In one embodiment of the method, freeze drying the $CuSiF_6$/graphene oxide material comprises freeze drying the $CuSiF_6$/graphene oxide material at a temperature of from about −60° C. to about −100° C. In another embodiment, the CuSiF6/graphene oxide material is freeze dried at a temperature of from about −60° C. to about −100° C. for at least 36 hours. In yet another embodiment, freeze drying the $CuSiF_6$/graphene oxide material comprises freeze drying the $CuSiF_6$/graphene oxide material at a temperature of about −81° C. for about 3 days. In one embodiment of the method, heating the $CuSiF_6$/graphene oxide material comprises heating the $CuSiF_6$/graphene oxide material to a temperature of from about 225° C. to about 275° C. In another embodiment, the $CuSiF_6$/graphene oxide material is heated to a temperature of from about 225° C. to about 275° C. for at least 1 hour. In still another embodiment, heating the $CuSiF_6$/graphene oxide material comprises heating the $CuSiF_6$/graphene oxide material to a temperature of about 250° C. for about 2 hours.

In another embodiment a method of solution-based reactions to produce copper fluoride nanoparticles may include (i) mixing copper oxide powder with fluorosilicic acid aqueous solution to provide a dispersion; (ii) heating and stirring the dispersion to produce $CuSiF_6 \cdot 6H_2O$; (iii) filtering the $CuSiF_6 \cdot 6H_2O$ to provide a damp $CuSiF_6 \cdot 6H_2O$ filtrate; (iv) freeze drying the damp $CuSiF_6 \cdot 6H_2O$ filtrate to provide a freeze dried sample; and (v) heating the freeze dried sample under air flow to produce $CuF_2$ nanoparticles. In one embodiment of this method, heating and stirring the dispersion comprises heating the dispersion to a temperature of from about 50° C. to about 70° C. In another embodiment, the dispersion is heated to a temperature of from about 50° C. to about 70° C. for at least 12 hours. In yet another embodiment, heating the dispersion is heated to a temperature of about 60° C. for about 25 hours. In one embodiment of this method, freeze drying the damp $CuSiF_6 \cdot 6H_2O$ filtrate comprises freeze drying the damp $CuSiF_6 \cdot 6H_2O$ filtrate under vacuum at a temperature of from about −60° C. to about −100° C. In another embodiment, the damp $CuSiF_6 \cdot 6H_2O$ filtrate is freeze dried under vacuum at a temperature of from about −60° C. to about −100° C. for at least 36 hours. In yet another embodiment, the damp $CuSiF_6 \cdot 6H_2O$ filtrate is freeze dried under vacuum at a temperature of about −81° C. for about 3 days. In one embodiment of this method, heating the freeze dried sample comprises heating the freeze dried sample to a temperature of from about 225° C. to about 275° C. In another embodiment, the freeze dried sample is heated to a temperature of from about 225° C. to about 275° C. for at least 1 hour. In still another embodiment, the freeze dried sample is heated to a temperature of about 250° C. for about 2 hours.

In another aspect, this disclosure provides a cathode active material for a lithium-ion battery comprising a nanocomposite of graphene and copper fluoride. In one embodiment, the nanocomposite comprises copper fluoride-to-graphene bonding. In another embodiment, the cathode active material has a ratio of graphene to copper fluoride whereby graphene comprises from about 0.5 to about 30%, by weight, of the cathode active material. In yet another embodiment, the cathode active material has a ratio of graphene to copper fluoride whereby graphene comprises from about 2 to about 20%, by weight, of the cathode active material. In still yet another embodiment, the cathode active material has a ratio of graphene to copper fluoride whereby graphene comprises from about 5 to about 15%, by weight, of the cathode active material. In one embodiment, the cathode active material has a specific capacity of at least 500 mAh/g and a working potential plateau of at least 2.5 V. In another embodiment, the cathode active material has a specific energy of at least 1400 Wh/kg.

In another aspect of the disclosure, there is provided a cathode for a lithium-ion battery comprising a cathode active material, the cathode active material comprising a nanocomposite of graphene and copper fluoride. In one embodiment, the nanocomposite comprises copper fluoride-to-graphene bonding. In another embodiment, the cathode active material has a ratio of graphene to copper fluoride whereby graphene comprises from about 0.5 to about 30%, by weight, of the cathode active material. In yet another embodiment, the cathode active material has a ratio of graphene to copper fluoride whereby graphene comprises from about 2 to about 20%, by weight, of the cathode active material. In still yet another embodiment, the cathode active material has a ratio of graphene to copper fluoride whereby graphene comprises from about 5 to about 15%, by weight, of the cathode active material. In one embodiment, the cathode active material has a specific capacity of at least 500 mAh/g and a working potential plateau of at least 2.5 V. In another embodiment, the cathode active material has a specific energy of at least 1400 Wh/kg.

In one embodiment, the cathode further comprises a polymeric binder material. The polymeric binder can include, for example, polyvinylidene difluoride. In another embodiment, the cathode further comprises a conductive additive, such as carbon black. In one embodiment, the cathode comprises from about 75% to about 85% cathode active material, from about 8% to about 12% polymeric binder material and from about 8% to about 12% conductive additive. In other embodiments, a conductive additive is not included. In another embodiment, the cathode has a specific capacity of at least 500 mAh/g and a working potential plateau of at least 2.5 V. In yet another embodiment, the cathode has a specific energy of at least 1400 Wh/kg. In alternative embodiments, the cathode is for use in a primary lithium-ion battery or in a secondary lithium-ion battery.

In yet another aspect, this disclosure provides a lithium-ion battery comprising a cathode, an anode, and an electrolyte, wherein the cathode comprises a cathode active material, the cathode active material comprising a nanocomposite of graphene and copper fluoride. In alternative embodiments, the battery is a primary lithium-ion battery or a secondary lithium-ion battery. The cathode may be any of the cathode embodiments described in this disclosure. Similarly, the cathode active material may be any of the cathode active material embodiments described in this disclosure.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE FIGURES

The concepts described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

FIG. 3A depicts voltage profiles of $CuF_2$-G with discharge rates from C/20, C/10, C/5, C/3, 1C, to 5/3C at room temperature; FIG. 3B depicts specific capacity of $CuF_2$-G at various discharge rates.

DETAILED DESCRIPTION

Figure 1:
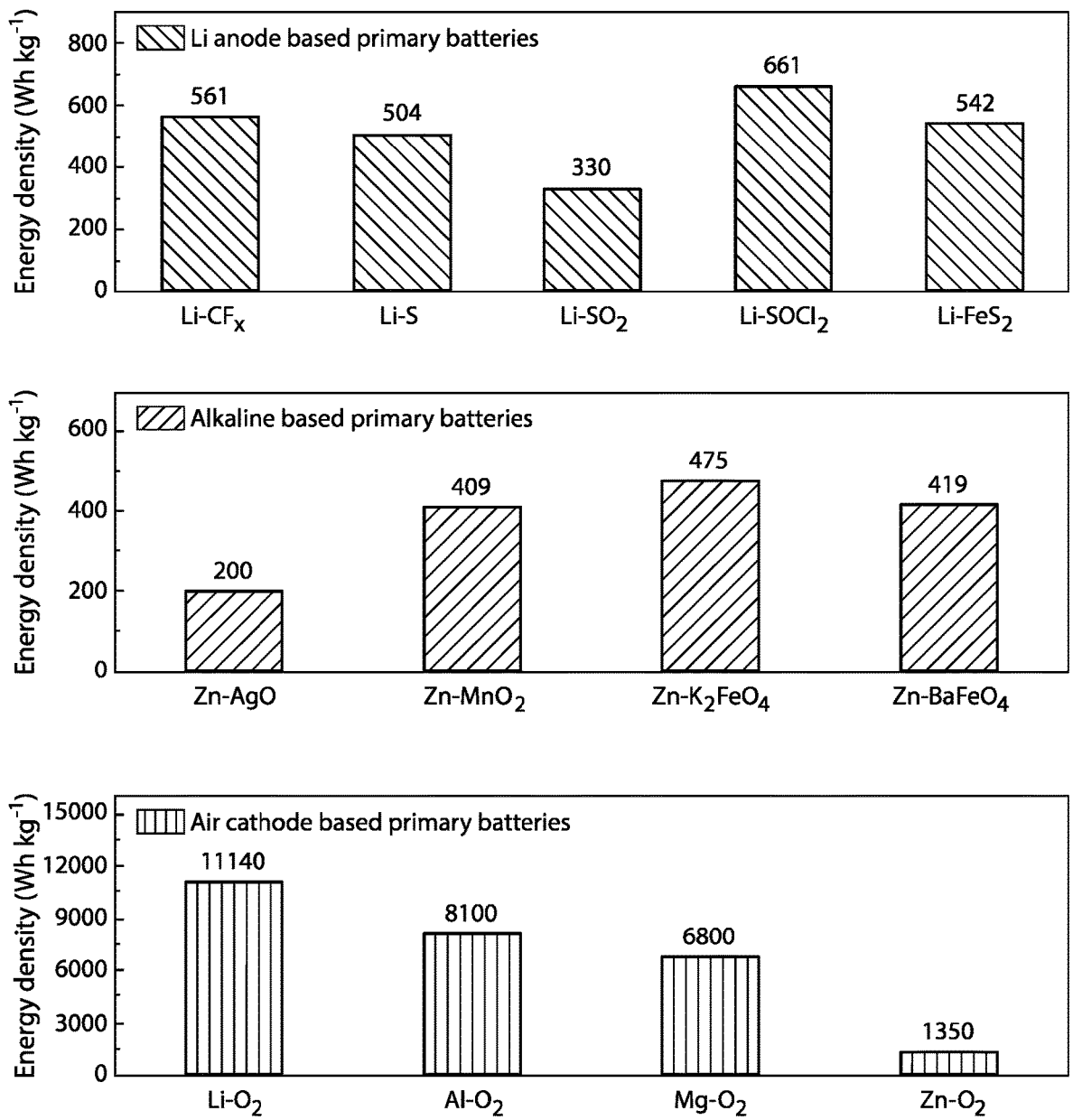
FIG. 1 depicts the energy density of various primary batteries: Li anode based primary batteries, alkaline based primary batteries, and air cathode based primary batteries.

While the concepts of the present disclosure are susceptible to various modifications and alternative forms, specific embodiments have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Unless defined otherwise, all technical and scientific terms used in this disclosure have the same meaning as commonly understood by one of ordinary skill in the art to which this application belongs. Moreover, it should be understood that when certain values and ranges are recited herein in connection with various embodiments of the present teachings, all values and ranges that fall between such listed values and ranges are intended to be encompassed by the present teaching unless explicitly stated otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 4.62, 5, and 5.9. This applies regardless of the breadth of the range. The upper and lower limits of these intervening ranges may independently be included in the smaller ranges, and are also encompassed within the disclosure, subject to any specifically excluded limit in the stated range. Where the stated range includes one or both of the limits, ranges excluding either or both of those included limits are also included in the disclosure, unless the context clearly dictates otherwise. Although specific methods and materials are described herein with respect to certain exemplary aspects of the present disclosure, it should be understood and appreciated that other methods and materials similar or equivalent to those described herein can be used in the practice or testing of the present application without straying from the intended scope of this disclosure.

The terminology used herein is for the purpose of describing particular embodiments only and is not intended to be limiting of any embodiment. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to effect such feature, structure, or characteristic in connection with other embodiments whether or not explicitly described.

Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). As used herein, the singular forms "a," "an" and "the" are intended to include the plural forms as well, unless the context clearly indicates otherwise. Further, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary. It will be further understood that the terms "includes", "comprises", "including" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Unless specifically stated or obvious from context, as used herein, the term "about" in reference to a number or range of numbers is understood to mean the stated number and numbers+/−10% thereof, or 10% below the lower listed limit and 10% above the higher listed limit for the values listed for a range.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the term "nanoparticle" refers to an elongated structure having a diameter on the order of nanometers and a length on the order of microns to millimeters, at least in some embodiments. In such embodiments, each nanoparticle may have an aspect ratio greater than 10, greater than 100, greater than 1000, or greater than 10,000. In some cases, the nanoparticle may have a diameter less than 1 μm, less than 100 nm, less than 50 nm, less than 25 nm, or less than 10 nm. Additionally, in some cases, the nanoparticle may have a diameter less than 1 nm. Typically, the nanoparticle may have a cylindrical or pseudo-cylindrical shape.

In search of cathode materials with high specific energy, metal fluorides or oxyfluorides have attracted more and more attention due to their higher potential, compared with oxides. $CuF_2$ has a high theoretical specific capacity of 528 mAh/g and a high theoretical potential of 3.55 V, leading to an extremely high theoretical specific energy of 1874 Wh/kg. $CuF_2$ has various characteristics, however, that have hindered its application as a cathode material for Li-based batteries, such as, for example, its low electronic conductivity[14] ($1.6 \times 10^{-9}$ S/cm) and $Li^+$ diffusion coefficient[15] ($10^{-17}$-$10^{-19}$ cm$^2$/s) and its low structural stability.

To address the challenges associated with $CuF_2$, the present disclosure employs two approaches to improve the performance of $CuF_2$ as a cathode active material: (1) making the $CuF_2$ nanosize to reduce the diffusion length and to overcome the obstacle of low diffusion coefficient; and (2) incorporating graphene to improve the electronic conductivity.

The present disclosure relates to the discovery that combining copper fluoride nanoparticles with graphene flakes to produce a hybrid copper fluoride-graphene nanocomposite overcomes significant drawbacks of copper fluoride alone, which have prevented development of acceptable lithium-ion batteries having copper fluoride cathodes. One benefit of the combination of graphene with copper fluoride described herein, also referred to as "graphene modification of copper fluoride materials," is that the hybrid nanocomposite material described herein overcomes the low electric conductivity of $CuF_2$, which is one of the major causes for the low rate and low specific capacity of copper fluoride materials. Other benefits of the disclosed hybrid nanocomposite material include that it has an improved structural stability and improved lithium ion diffusion characteristics relative to copper fluoride nanoparticles alone.

Moreover, the present disclosure lends itself to a variety of optimization opportunities for various uses of the copper fluoride-graphene materials because incorporation of graphene into a hybrid nanocomposite material in varying proportions permits modulation of the morphology, structure and performance of the resulting cathode-active hybrid nanocomposite material. The incorporation of graphene provides an effective and robust tool for tailoring the materials to achieve specifically desired properties including, for example and without limitation, surface hydrophobicity, intra/inter-particle electric conductivity, particle size and morphology, while producing a material that remains cost effective.

Figure 2:
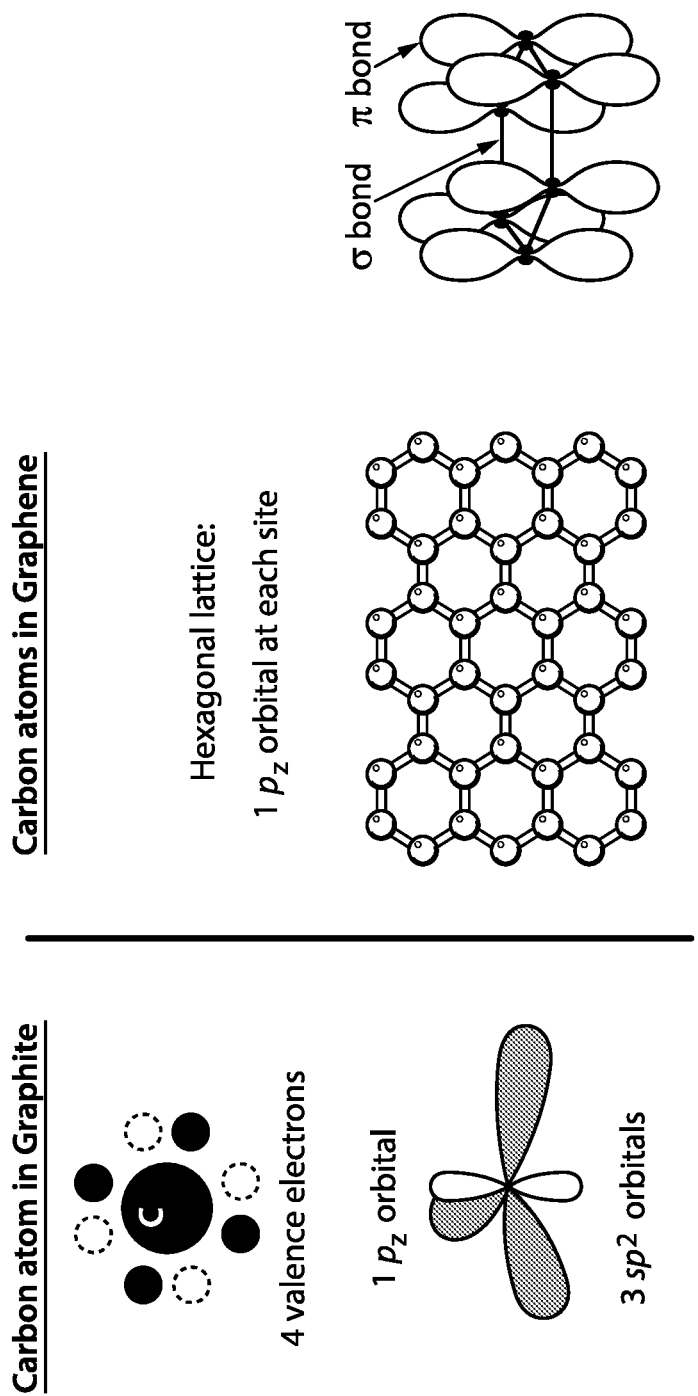
FIG. 2 depicts the electronic structure and bonding of graphene.

Graphene is a single atomic layer of $sp^2$-bonded carbon atoms arranged in a honeycomb crystal structure and can be viewed as an individual atomic plane of the graphite structure. In graphene, each carbon atom uses 3 of its 4 valance band (2s, 2p) electrons (which occupy the 3 $sp^2$ orbits) to form 3 covalent bonds with the neighboring carbon atoms in the same plane. Each carbon atom in the graphene contributes its fourth lone electron (occupying the $p_z$ orbit) to form a delocalized electron system, a long-range π-conjugation system shared by all carbon atoms in the graphene plane (FIG. 2). Such a long-range π-conjugation in graphene yields extraordinary electrical properties (e.g. extremely high electric conductivity, $6.29 \times 10^7$ S/cm), mechanical properties (e.g. fracture strength ~130 GPa), and thermal properties (e.g. 3000 W/m-K in plane).

In the hybrid nanocomposite materials described herein, the presence of graphene sheets (also referred to herein as "graphene flakes"), significantly improves the $CuF_2$ morphology. Small, typically nano-shuttle shaped $CuF_2$ nanoparticles (nanorod with sharp ends, with average size of 250 nm in length and 20 nm in diameter) are uniformly formed over the graphene sheets, while the $CuF_2$ alone (also referred to herein as "blank $CuF_2$") takes the form of large agglomerates or chunks (5-20 μm) with some small particles on the surface (20 nm).

In one aspect, the present disclosure provides cathode active material for a lithium-ion battery comprising a nanocomposite of graphene and copper fluoride. In one embodiment, the cathode active material has a ratio of graphene to copper fluoride whereby graphene comprises from about 0.5 to about 30%, by weight, of the cathode active material, more preferably from about 2 to about 20%, by weight and still more preferably from about 5 to about 15%, by weight. In one embodiment, the nanocomposite comprises copper fluoride-to-graphene bonding.

A hybrid $CuF_2$-graphene nanocomposite cathode active material can be made by a process that includes mixing a first quantity of $CuSiF_6 \cdot 6H_2O$ with a second quantity of an aqueous graphene oxide solution to provide an aqueous mixture; heating the aqueous mixture to produce a $CuSiF_6$/graphene oxide material; freeze drying the $CuSiF_6$/graphene oxide material; and, after the freeze drying, heating the $CuSiF_6$/graphene oxide material under air flow to produce a $CuF_2$-graphene nanocomposite. The $CuSiF_6 \cdot 6H_2O$ can be prepared, for example, by mixing copper oxide powder with fluorosilicic acid aqueous solution to provide a dispersion, heating and stirring the dispersion to produce $CuSiF_6 \cdot 6H_2O$, and filtering the $CuSiF_6 \cdot 6H_2O$ to provide a $CuSiF_6 \cdot 6H_2O$ filtrate. In one embodiment, the first quantity of $CuSiF_6 \cdot 6H_2O$ and the second quantity of graphene oxide are present in the aqueous mixture at a ratio of from about 25:1 to about 10:1, by weight. In another embodiment, the first quantity of $CuSiF_6 \cdot 6H_2O$ and the second quantity of graphene oxide are present in the aqueous mixture at a ratio of about 18:1, by weight.

In one embodiment, the aqueous mixture is heated to a temperature of from about 160° C. to about 200° C. In another embodiment, the aqueous mixture is heated to a temperature of from about 160° C. to about 200° C. for at least 8 hours. In yet another embodiment, the aqueous mixture is heated to a temperature of about 180° C. for about least 12 hours.

In one embodiment, the $CuSiF_6$/graphene oxide material is freeze dried at a temperature of from about −60° C. to about −100° C. In another embodiment, the $CuSiF_6$/graphene oxide material is freeze dried at a temperature of from about −60° C. to about −100° C. for at least 36 hours. In yet another embodiment, the $CuSiF_6$/graphene oxide material is freeze dried at a temperature of about −81° C. for about 3 days.

In one embodiment, the $CuSiF_6$/graphene oxide material is heated to a temperature of from about 225° C. to about 275° C. In another embodiment, the $CuSiF_6$/graphene oxide material is heated to a temperature of from about 225° C. to about 275° C. for at least 1 hour. In yet another embodiment, the $CuSiF_6$/graphene oxide material is heated to a temperature of about 250° C. for about 2 hours.

In one embodiment, the cathode active material in accordance with the present disclosure has a specific capacity of at least 500 mAh/g and a working potential plateau of at least 2.5 V. In another embodiment, the cathode active material has a specific energy of at least 1400 Wh/kg.

In addition to the materials and methods described above, the present disclosure also provides in another aspect a cathode for a lithium-ion battery that comprises a cathode active material as described herein and a lithium-ion battery comprising such a cathode. In one embodiment, the cathode further comprises a polymeric binder material. A variety of polymeric binding materials suitable for use in lithium-ion batteries and other batteries are known, and the present disclosure is not intended to be limited to a specific binder. In one embodiment, the polymeric binder comprises polyvinylidene difluoride. In another embodiment, the cathode further comprises a conductive additive such as, for example and without limitation, carbon black, graphite, multi-walled carbon nanotubes, carbon fibers or the like. In one embodiment, the cathode comprises from about 75% to about 85% cathode active material, from about 8% to about 12% polymeric binder material and from about 8% to about 12% carbon black. In another embodiment, the cathode has a specific capacity of at least 500 mAh/g and a working potential plateau of at least 2.5 V. In yet another embodiment, the cathode has a specific energy of at least 1400 Wh/kg.

With regard to batteries themselves, in one embodiment, the present disclosure provides a lithium-ion battery that comprises a cathode as described herein, an anode and an electrolyte. In one embodiment, the battery is a primary lithium-ion battery. In another embodiment, the battery is a secondary lithium-ion battery. A variety of compositions and architectures are known in the art for use as anodes and electrolytes in such lithium-ion batteries, and for constructing such batteries and cells and are suitable for use in combination with the cathode active materials described herein. The present disclosure is not intended to be limited to any specific anode material, electrolyte material or architecture.

Among other things, the present disclosure demonstrates a commercially viable and scalable methodology for producing cathode active materials comprising hybrid $CuF_2$-graphene nanocomposite materials and for producing lithium-ion batteries using same. The process contemplated herein also enables fabrication of a wide variety of hybrid $CuF_2$-graphene nanocomposite materials with one or more feature or combination of features optimized. For example, certain modifications are contemplated that make the cathode-active material more suitable for secondary lithium-ion batteries. In some embodiments, a functionalized graphene can be used as a starting material that has different charge groups (e.g., —OH, —COOH and —$NH_3$) to affect the ligand field of $CuF_2$ to stabilize the $CuF_2$. For example, surface properties of graphene can be modified to covalently graft selected chemical groups onto the surface of the graphene through a diazonium reaction as shown below:

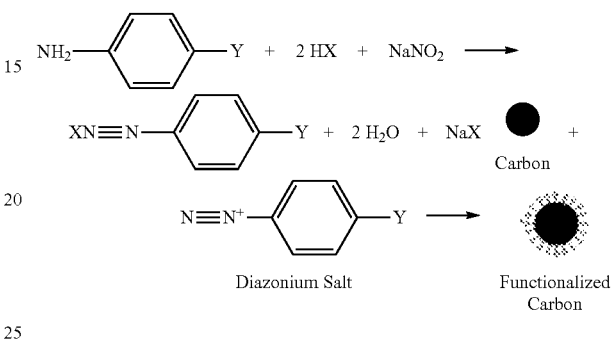

Diazonium Salt            Functionalized Carbon

In this reaction, the functional group Y is attached onto the graphene surface through diazonium salt $XN_2C_6H_4$—Y ((i.e. Y=Sulfonate, $SO_3^-M^+$, Carboxylate, $COO^-M^+$; and Tertiary amine, $NR_3^+X^-$; and polymer groups, PBI, PEO, PPO etc.). Different functional groups such as, for example, polybenzimidazole (PBI as the catalyst support) and polyaniline (PANI as the anode for Li-on batteries and supercapacitors) can be covalently grafted to the graphene surface (e.g., $G-SO_3^-H^+$, and $G-NH_3$ as the catalyst support) and to the carbon black (CB) surface (e.g., $CB—SO_3H$ as the catalyst support). The diazonium reaction-based functionalization is a simple and cost-effective way to transform the pure graphene sheets into hierarchical and functional materials that can provide the desired properties (i.e. hydrophobicity, $Li^+/e^-$ conductivity, nanoparticle dispersion and local electric field, etc.) and to provide functionalized graphene sheets for $CuF_2$ nanoparticles to anchor. In addition to enabling variability and optimization, and to enable incorporating functionalization to make cathode active materials described herein more suitable for use in secondary lithium-ion batteries, such methods are also readily scalable for large-scale manufacturing.

In another aspect, the disclosure provides a solution-based method for making copper fluoride nanoparticles. In one embodiment, the method includes mixing copper oxide powder with fluorosilicic acid aqueous solution to provide a dispersion; heating and stirring the dispersion to produce $CuSiF_6 \cdot 6H_2O$; filtering the $CuSiF_6 \cdot 6H_2O$ to provide a damp $CuSiF_6 \cdot 6H_2O$ filtrate; freeze drying the damp $CuSiF_6 \cdot 6H_2O$ filtrate to provide a freeze dried sample; and heating the freeze dried sample under air flow to produce $CuF_2$ nanoparticles. The heating and stirring of the dispersion can be performed at a temperature of from about 50° C. to about 70° C., more preferably at a temperature of from about 50° C. to about 70° C. for at least 12 hours and still more preferably at a temperature of about 60° C. for about 25 hours. The freeze drying of the damp $CuSiF_6 \cdot 6H_2O$ filtrate can be performed at a temperature of from about −60° C. to about −100° C., more preferably at a temperature of from about −60° C. to about −100° C. for at least 36 hours and still more preferably at a temperature of about −81° C. for about 3 days. In certain preferred embodiments, the freeze drying is performed under vacuum. The heating of the freeze dried sample can be performed at a temperature of from about 225° C. to about 275° C., more preferably at a temperature of from about 225° C. to about 275° C. for at least 1 hour and still more preferably at a temperature of about 250° C. for about 2 hours.

EXAMPLES

Examples related to the present disclosure are described below. In some embodiments, alternative techniques can be used. The examples are intended to be illustrative and are not limiting or restrictive of the scope of the invention as set forth in the claims.

Preparation of $CuF_2$ Nanoparticles $CuF_2$ nanoparticles were synthesized through a solution reaction process. Copper oxide powder (CuO, 98%, Alfa Aesar, Massachusetts, US) was mixed with 25 wt. % fluorosilicic acid aqueous solution ($H_2SiF_6$, 25% wt. %, Sigma-Aldrich, Missouri, US) in an Erlenmeyer flask. The mixture was then heated to 60° C. for 25 h under constant stirring. The resulting mixture was filtered by a 0.45 μm nylon filter membrane (Sigma-Aldrich, Missouri, US). The $CuSiF_6 \cdot 6H_2O$ solution was transferred to a FreeZone Plus 6 Liter Cascade Console Freeze Dry System (Labconco Corporation, Missouri, US) before it was fully dried. The chamber of the freeze dryer was then pulled to vacuum after the sample was cooled down to −81° C. After drying for three days in the freeze dryer, the sample was collected from the freeze dryer and transferred to a bench-top tube furnace (GSL-1800X, MTI, California, US). The sample was then heated in air flow at 250° C. for 2 hours before the $CuF_2$ product was harvested.

Preparation of Graphene Oxide

Hummers' method[16] was modified to synthesize graphene oxide ("GO") in this example. Pre-oxidation of graphite flakes was conducted through mixing 10 g graphite powder (Sigma-Aldrich, Missouri, US), 50 ml concentrated sulfuric acid (ACS reagent grade, 95.0-98.0%, Sigma-Aldrich, Missouri, US), 10 g potassium persulfate ($K_2S_2O_8$, ≥99.0%, Sigma-Aldrich, Missouri, US) and 10 g phosphorus pentoxide ($P_2O_5$, ACS reagent, ≥98.0%, Sigma-Aldrich, Missouri, US). The mixture was heated to 80° C. and then cooled to room temperature. Then, the pre-oxidized graphite was washed and filtered with DI water. The remaining solid was then transferred to a vacuum and dried at 80° C. overnight and then the pre-oxidized graphite was harvested. Two grams of pre-oxidized graphite powder, one gram of $NaNO_3$ (ACS reagent grade, ≥99.0%, Sigma-Aldrich, Missouri, US), and 46 ml of concentrated sulfuric acid (ACS reagent grade, 95.0-98.0%, Sigma-Aldrich, Missouri, US) were mixed in a 500 ml round bottom flask under constant stirring for 30 min. Then six grams of $KMnO_4$ (ACS reagent grade, ≥99.0%, Sigma-Aldrich, Missouri, US) was added into the above mixture slowly in an ice bath. After mixing for 2 h, 92 ml DI water was slowly added into the flask and an oil bath was applied to keep the temperature of the solution between 95 and 100° C. After 10 min, the solution was cooled and then the solution was diluted by the addition of 280 ml DI water. The diluted solution was then further oxidized by the addition of 10 ml 30 wt. % $H_2O_2$ (30% in $H_2O$, contains stabilizer, Sigma-Aldrich, Missouri, US). The homogeneous solution was then centrifuged and washed by DI water and 0.1 M HCl solution prepared from (ACS reagent grade, 37%, Sigma-Aldrich, Missouri, US) to remove the remaining impurity ions. After the solution was washed repeatedly by DI water and HCl solution (0.1 M, ACS reagent, 37%, Sigma-Aldrich, Missouri, US), the remaining product was dispersed in DI water to form a homogeneous GO solution.

Preparation of $CuF_2$/Graphene Nanocomposite

The synthesis of a hybrid $CuF_2$/G nanocomposite (referred to herein as "$CuF_2$/G" or "$CuF_2$-G") was preformed via a solution reaction followed by a solid-state synthesis, but modified by the addition of GO. After the overnight reaction between CuO and $H_2SiF_6$ solution was completed, the product was filtrated and collected. 10 wt. % graphene oxide relative to $CuF_2$ was added into the above dispersion under constant stirring. Then the solution was transferred into a Teflon lined stainless steel autoclave for the hydrothermal reaction. The autoclave was heat treated in the oven (Bench-Top Muffle Furnace KSL-1800X-KA-UL, MTI Corporation, California, US) under 180° C. for 12 h to ensure the hydrothermal process was fully completed. Then the resulting $CuSiF_6$/GO product was freeze dried in a freeze dryer (FreeZone Plus 6 Liter, Labconco Corporation, Missouri, US) at −81° C. for 3 days before it was fully dried. Then the solid was transferred to a tube furnace (GSL-1800X, MTI, California, US) and heat treated at 250° C. for 2 h under constant air flow.

TEM Characterization

The TEM work was performed in a FEI Titan G3 double-corrected Themis operated at 80 kV and equipped with a high-angle annular dark field (HAADF) detector for high resolution images (spatial resolution of 1 Å). The SAED patterns recording dose rate was 1.42 $C/cm^2/s$ and total electron doses were from 20 to 780 $C/cm^2$. The diffraction patterns were processed by alignment and background removal to produce diffraction intensity profiles.

Preparation of Electrode and Electrochemical Cells

Electrodes were prepared by casting a slurry of 80% $CuF_2$-G prepared as described above, 10% polyvinylidene difluoride (PVdF, battery grade, Alfa Aesar, Massachusetts, US), and 10% carbon black (Super P Li, ≥99.0%, TIMCAL, IMERYS Graphite & Carbon, Switzerland) onto a 10-mm-thick sheet of Al foil (17 μm thick, Sigma-Aldrich, Missouri, US). For comparison, pure $CuF_2$ electrodes were prepared with the same procedure. The prepared electrodes were placed in a vacuum oven and allowed to dry at 80° C. for 24 h. The electrolyte consisted of a solution of 1.2 M $LiPF_6$ (Novolyte, Ohio, US) in a mixture of solvent from ethylene carbonate, ethyl methyl carbonate and methyl propionate (EC:MP:EMC; 2:6:2, by volume; Novolyte, Ohio, US). The prepared $CuF_2$-G and $CuF_2$ electrodes were assembled into 2016-type coin cells (MTI, California, US) using Li metal anodes (250 μm thick, MTI, California, US) and Celgard 2500 separators (Celgard, Ohio, US) for characterizing their electrochemical performance.

Electrochemical Performance Characterization

The assembled cells were tested in room temperature with an Arbin Battery cycler (BT-2000, Arbin, TX, USA) using different C-rates and discharging to 1.0 V. The dQ/dV curves were plotted based on charge/discharge cycles at 0.05 C. The half-cell cyclic voltammetry (CV) experiments were carried out on both $CuF_2$ and $CuF_2$-G cells with different scan rate from 0.2 mV/s to 20 mV/s using a 1470E Multistat (Solartron Analytic, England, UK). The potential window was set from 1.0 V to 4.0 V. A Solartron 1287A/1260A Potentiostat/Impedance System (Solartron Analytical, England, UK) was used to measure the AC impedance of these cells in the frequency range of 0.01 Hz-1 MHz with an amplitude of 5 mV. The results were fitted with Zview software (Scribner Associates Inc., North Carolina, US) using the model shown in FIG. 4A, where $R_0$ is the contact resistance, Re and Ce stand for the electric resistance and capacitance of the electrode, $R_{dl}$ and $C_{st}$ stand for the charge-transfer resistance of the redox reaction of vanadium in $CuF_2$ and the double-layer capacitance in the electrode, respectively, and W refers to the Warburg diffusion impedance, which could reflect the diffusion of Li ions in the $CuF_2$.

Results and Discussion

Electrochemical Performance.

Figure 3A:
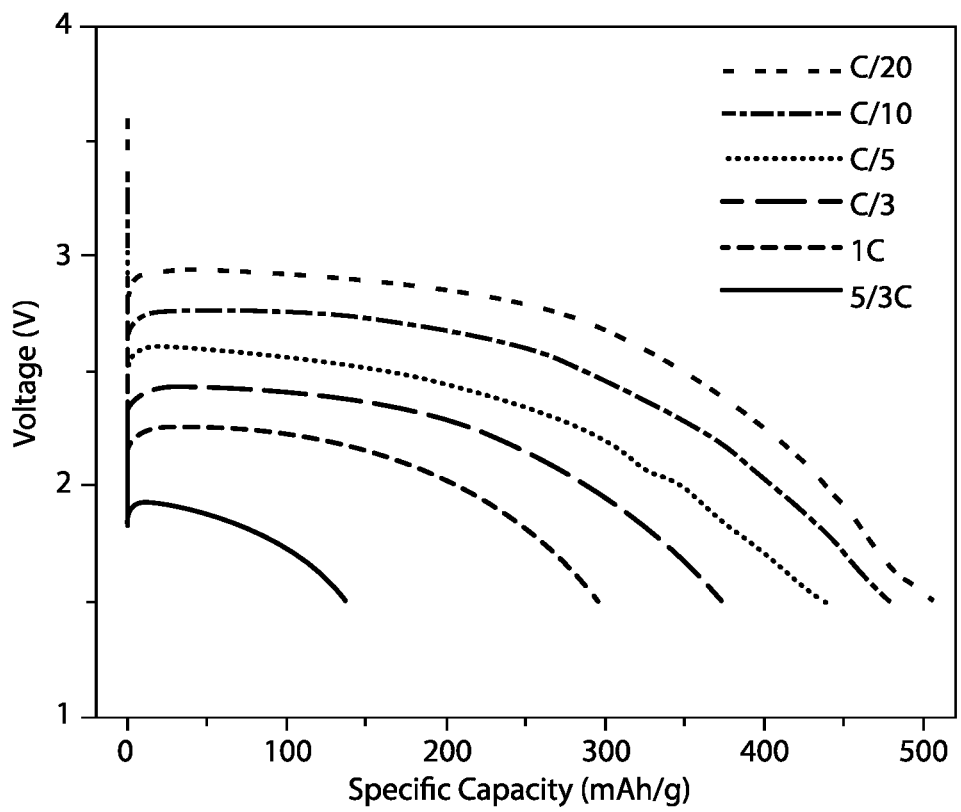
FIGS. 3A-3B depict electrochemical performance of $CuF_2$-G.
Figure 3B:
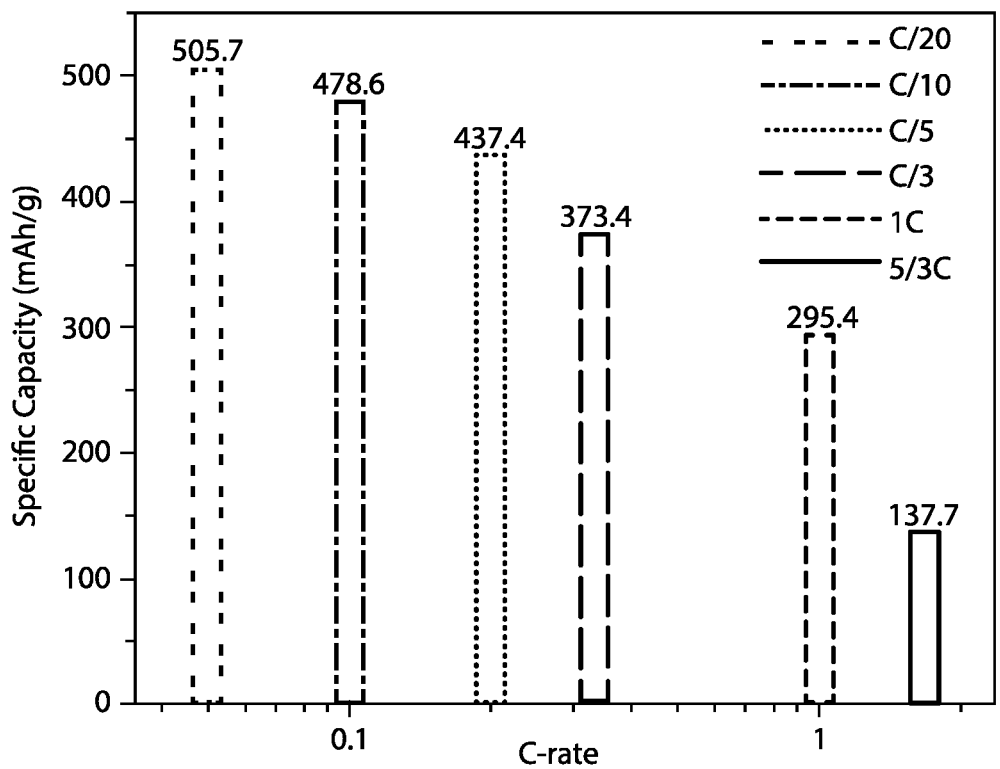

$CuF_2$-G was characterized electrochemically by galvanostatic discharge with a cut-off voltage of 1.5 V, and discharge rates from C/20, C/10, C/5, C/3, 1C, to 5/3C at room temperature, the results of which are presented in FIG. 3. The specific capacity reaches 505.7 mAh/g @ C/20, which is 96.7% of theoretical specific capacity, corresponding to 1.93 Li, and a high close to 3 V voltage plateau. However, both specific capacity and voltage decrease with increasing C-rate, reaches 478.6, 437.4, 373.4, 295.4, 137.7 mAh/g, corresponding to 91.5%, 83.6%, 71.4%, 56.5%, and 26.3% of the theoretical specific capacity. The high rate performance can be improved with additional optimization.

Figure 4A:
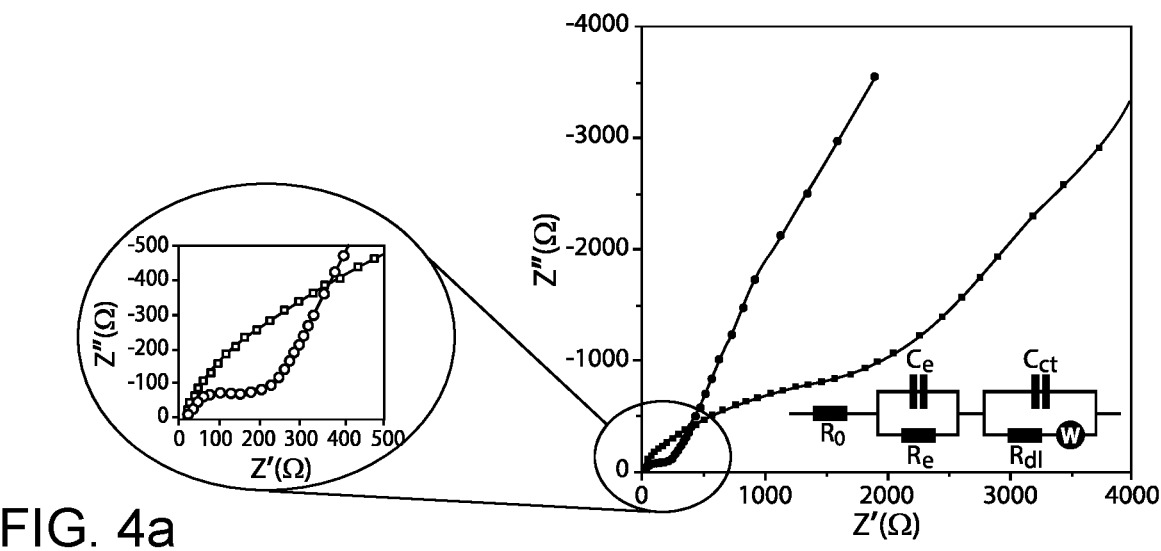
FIGS. 4A-4C depict electrochemical impedance spectroscopy (FIG. 4A) and fitting results (FIGS. 4B and 4C). Frequency range: 1 MHz~1 mHz, amplitude: 5 mV.
Figure 4B:
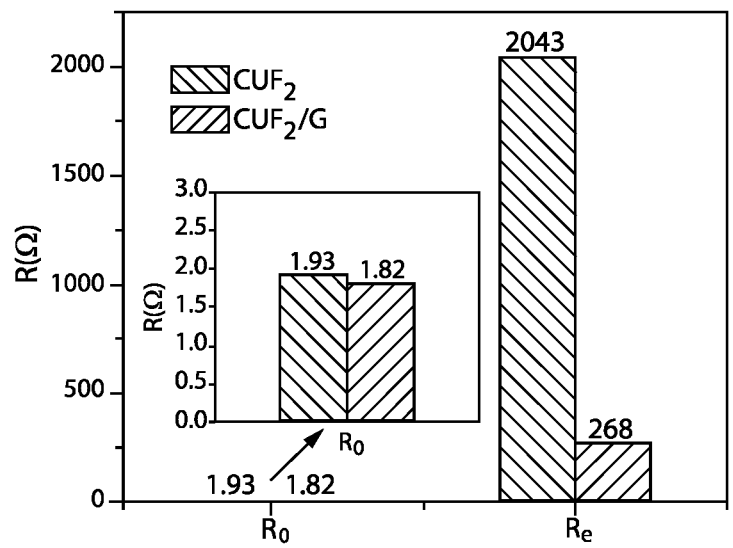
Figure 4C:
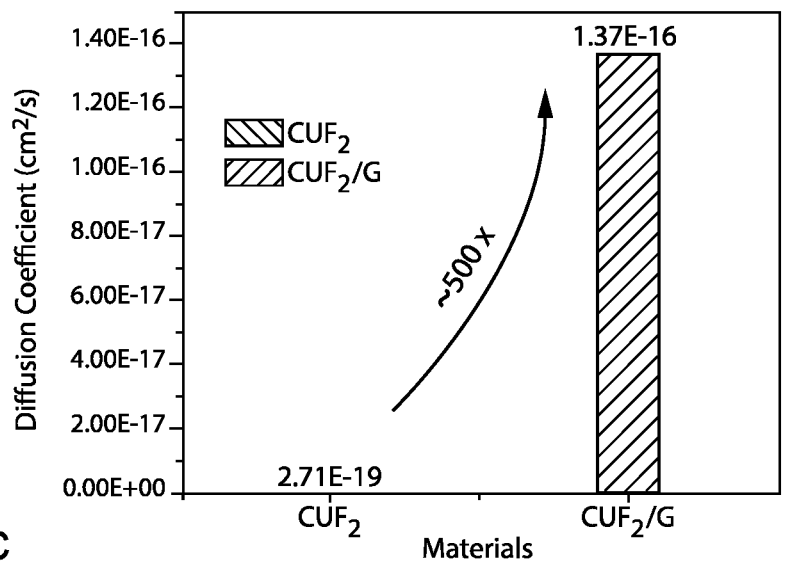

The electrochemical impedance spectroscopy (EIS) was employed to investigate the effect of graphene incorporation. The EIS results (Nyquist plot) along with the equivalent circuit used to fit the EIS results of blank $CuF_2$ and $CuF_2$-G are shown in FIGS. 4A-4C, which shows that graphene incorporation greatly reduced the impedance relative to blank $CuF_2$. Although the Ohmic resistance was not reduced much, the electronic resistance of $CuF_2$ electrode ($R_e$) was greatly reduced by 86.9%, from 2043Ω to 268Ω. The smaller electrode resistance indicates that the graphene nanosheets improved the conductivity and facilitated the electrochemical reaction. In addition, the diffusion coefficient was also greatly improved from $2.71 \times 10^{-19}$ cm$^2$/s to $1.37 \times 10^{-16}$ cm$^2$/s, which was increased by 500 times, and which consequently made the Li ion diffusion in the solid phase faster and easier.

Morphology and Structure.

Figure 5A:
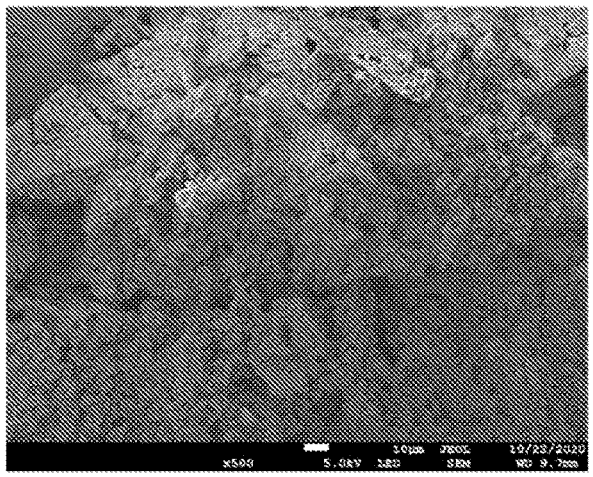
FIGS. 5A-5D depict Scanning Electron Microscope (SEM) images of nanostructured $CuF_2$ (5A and 5C) and $CuF_2$-G (5B and 5D).
Figure 5B:
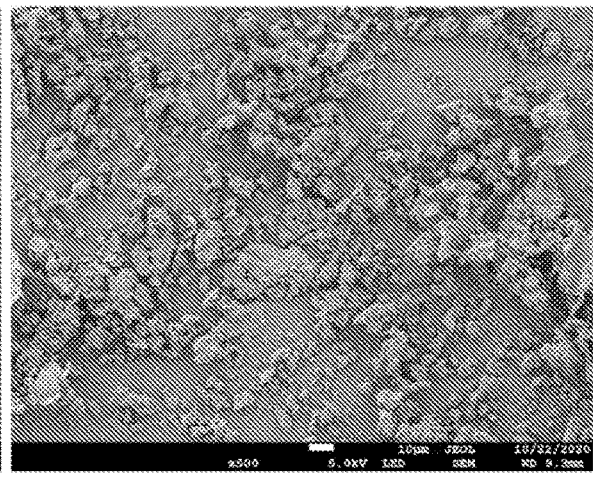
Figure 5C:
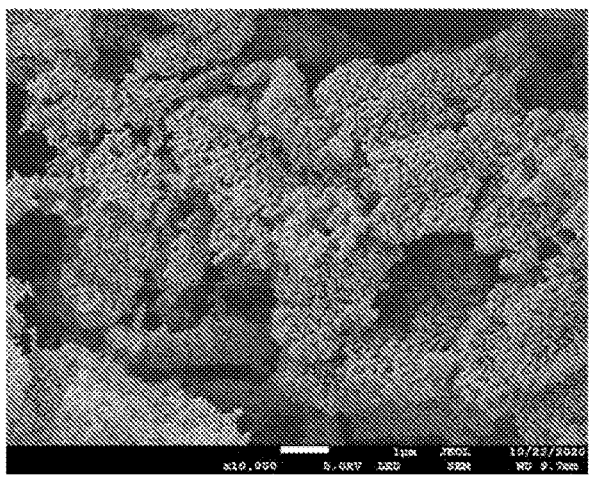
Figure 5D:
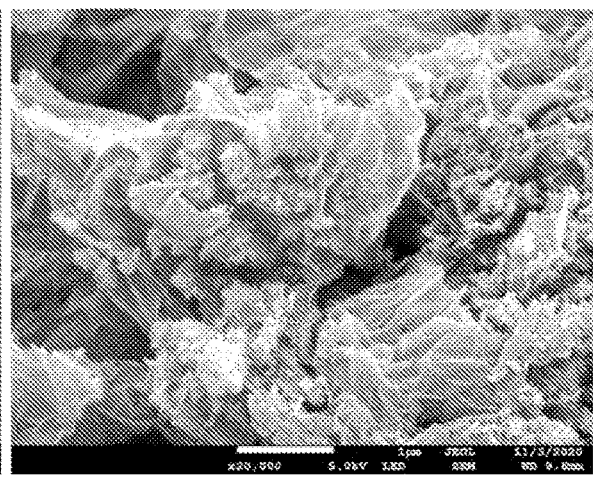

A uniform nanostructured $CuF_2$ produced through our unique solution-based approach is shown in SEM images of FIGS. 5A and 5C, which show that, without support of graphene sheets, the nanosized particles agglomerate together and form large chunks. With our approach to incorporate graphene, the $CuF_2$ grew into nanoparticles over the graphene sheet as shown in FIGS. 5B and 5D. The nanoparticles uniformly distributed on the surface of graphene sheets and did not agglomerate to large chunks. The graphene sheets as substrates hold the nanoparticles together uniformly and provide electron conduction, which in consequence greatly improved the performance of the material as a cathode active material.

Figure 6A:
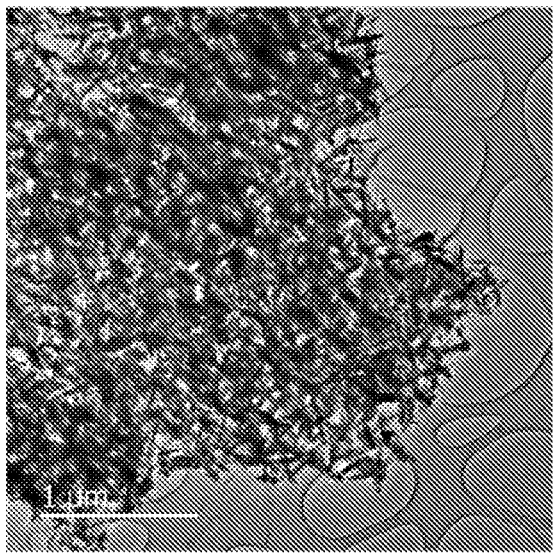
FIGS. 6A-6D depict Transmission Electron Microscope (TEM) images of nanostructured $CuF_2$ (6A and 6C) and $CuF_2$-G (6B and 6D).
Figure 6B:
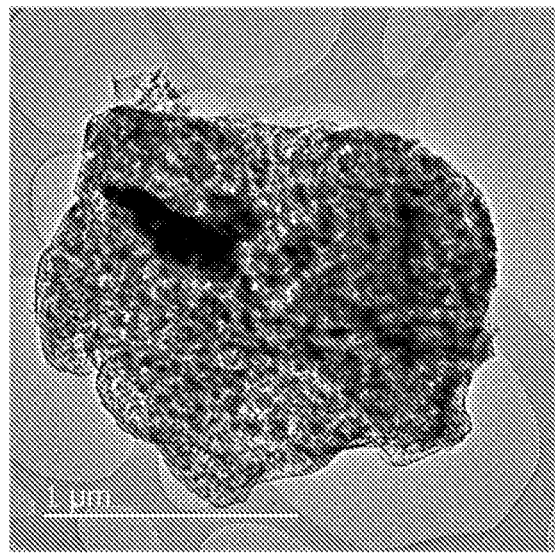
Figure 6C:
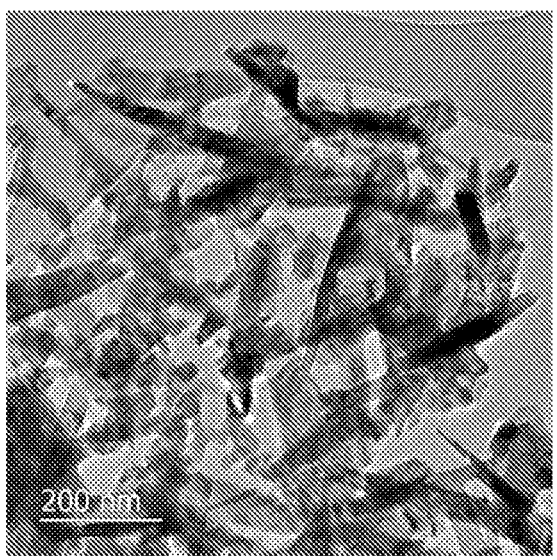
Figure 6D:
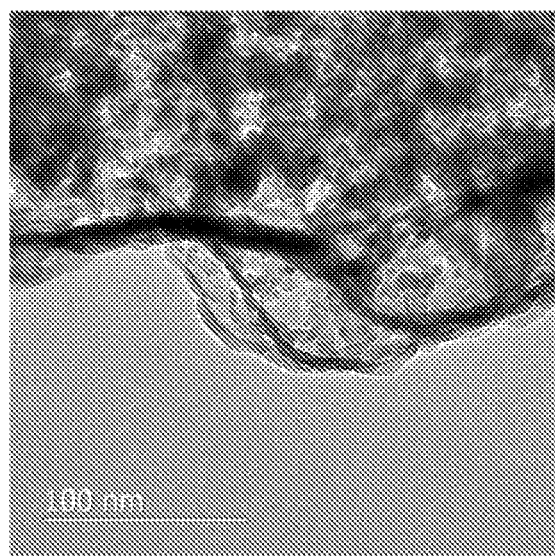

The TEM images (FIGS. 6A-6D) show similar features of the $CuF_2$ and $CuF_2$-G. The $CuF_2$ nanoparticles are in nano-shuttle shape (nanorod with sharp ends, FIGS. 6A and 6C) with the average size of 250 nm in length and 20 nm in diameter. However, without graphene support, they just randomly stacked together and formed large agglomerates. The graphene-incorporated sample images (FIGS. 6B and 6D) show that the nanosized $CuF_2$ particles are sandwiched between graphene sheets, forming a 3-D sandwich-like structure shown by the high resolution TEM. The particles are nicely wrapped by graphene sheets, and the particles has smaller size (30 nm in length and 4 nm in diameter) than blank $CuF_2$ samples. Graphene sheets with high mechanical strength help to hold these nano-shuttles together, and provide high electronic conductivity, consequently, improving the performance of the cathode active material.

Surface Area and Pore Distribution.

Figure 7A:
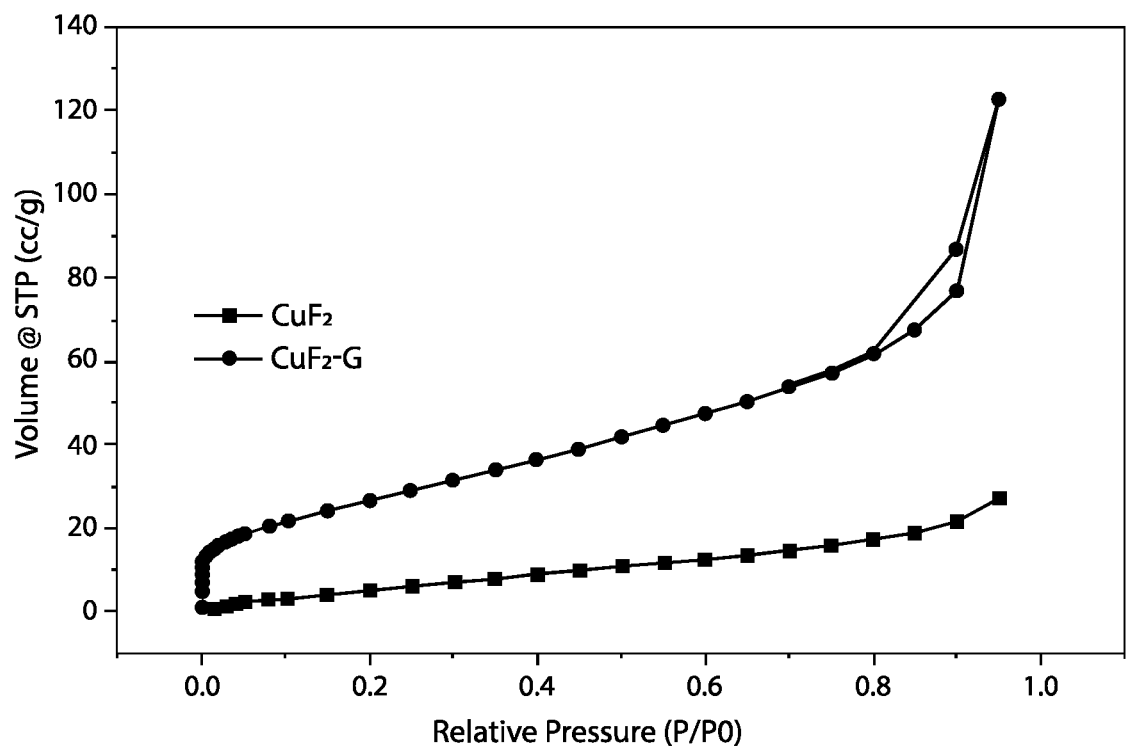
FIGS. 7A-7B depict results of BET surface area analysis of the materials described in the Examples.
Figure 7B:
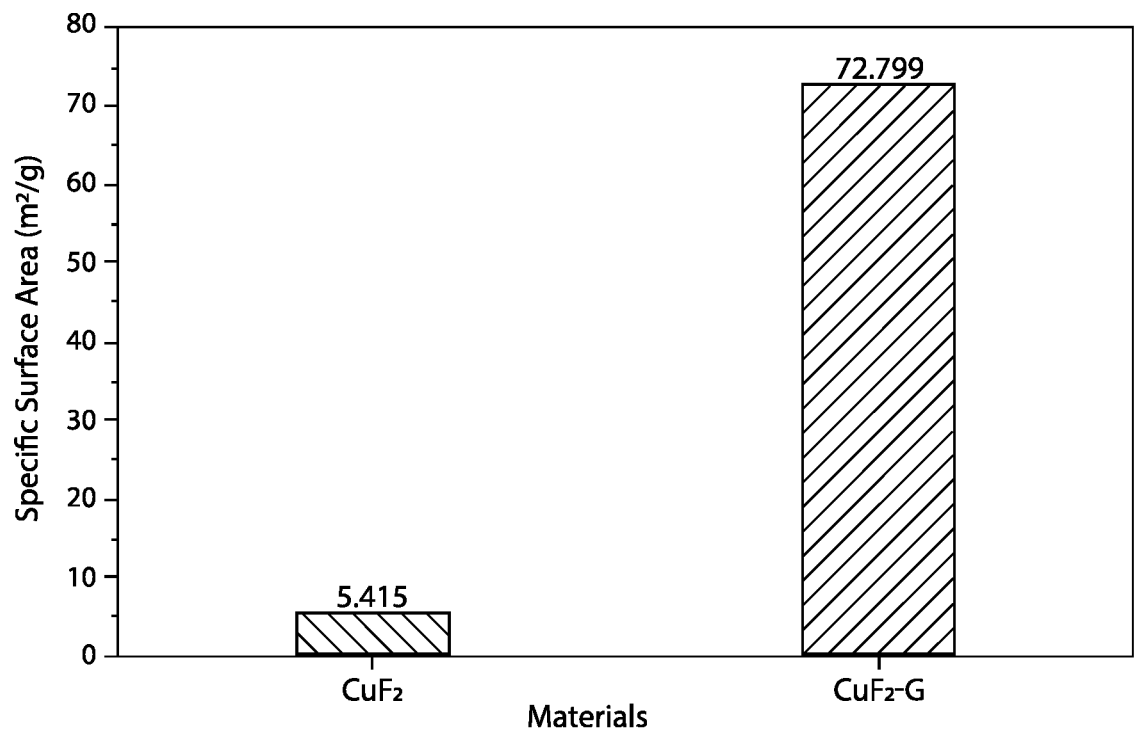

The BET surface area results are shown in FIGS. 7A-7B. The incorporation of graphene significantly improved the specific surface area from 5.415 m$^2$/g to 72.799 m$^2$/g (13× improvement), which prevents the agglomeration of the nanoparticles of $CuF_2$, and improves the rate performance and specific power consequently.

REFERENCES

Each of the following documents is hereby expressly incorporated by reference herein in its entirety.

[1] D. E. Glass, J.-P. Jones, A. V. Shevade, D. Bhakta, E. Raub, R. Sim, R. V. Bugga, *Journal of Power Sources* 2020, 449, 227492; bK. Chen, D. R. Merritt, W. G. Howard, C. L. Schmidt, P. M. Skarstad, *Journal of power sources* 2006, 162, 837-840.

[2] C. Peng, Y. Li, F. Yao, H. Fu, R. Zhou, Y. Feng, W. Feng, *Carbon* 2019, 153, 783-791.

[3] Y. Ma, H. Zhang, B. Wu, M. Wang, X. Li, H. Zhang, *Scientific reports* 2015, 5, 14949.

[4] D. Linden, B. McDonald, *Journal of Power Sources* 1980, 5, 35-55.

[5] A. Dey, *Journal of Power Sources* 1980, 5, 57-72.

[6] T. Evans, D. M. Piper, S. C. Kim, S. S. Han, V. Bhat, K. H. Oh, S. H. Lee, *Advanced Materials* 2014, 26, 7386-7392.

[7] K. T. Braam, S. K. Volkman, V. Subramanian, *Journal of Power Sources* 2012, 199, 367-372.

[8] D. Chao, W. Zhou, C. Ye, Q. Zhang, Y. Chen, L. Gu, K. Davey, S. Z. Qiao, *Angewandte Chemie International Edition* 2019, 58, 7823-7828.

[9] X. Yu, S. Licht, *Journal of power sources* 2007, 171, 966-980.

[10] Y. Tian, H. Yue, Z. Gong, Y. Yang, *Electrochimica Acta* 2013, 90, 186-193.

[11] B. Xu, H. Lu, W. Cai, Y. Cao, Y. Deng, W. Yang, *Electrochimica Acta* 2019, 305, 360-369.

[12] H. Xiong, K. Yu, X. Yin, Y. Dai, Y. Yan, H. Zhu, *Journal of Alloys and Compounds* 2017, 708, 652-661.

[13] N. Xu, Y. Cai, L. Peng, J. Qiao, Y.-D. Wang, W. M. Chirdon, X.-D. Zhou, *Nanoscale* 2018, 10, 13626-13637.

[14] M. Mäntymäki, M. Ritala, M. Leskelä, *Coatings* 2018, 8, 277.

[15] L. Wang, Z. Wu, J. Zou, P. Gao, X. Niu, H. Li, L. Chen, *Joule* 2019, 3, 2086-2102.

[16] [1] aD. E. Glass, J.-P. Jones, A. V. Shevade, D. Bhakta, E. Raub, R. Sim, R. V. Bugga, *Journal of Power Sources* 2020, 449, 227492; bK. Chen, D. R. Merritt, W. G. Howard, C. L. Schmidt, P. M. Skarstad, *Journal of power sources* 2006, 162, 837-840.

[2] C. Peng, Y. Li, F. Yao, H. Fu, R. Zhou, Y. Feng, W. Feng, *Carbon* 2019, 153, 783-791.

[3] Y. Ma, H. Zhang, B. Wu, M. Wang, X. Li, H. Zhang, *Scientific reports* 2015, 5, 14949.

[4] D. Linden, B. McDonald, *Journal of Power Sources* 1980, 5, 35-55.

[5] A. Dey, *Journal of Power Sources* 1980, 5, 57-72.

[6] T. Evans, D. M. Piper, S. C. Kim, S. S. Han, V. Bhat, K. H. Oh, S. H. Lee, *Advanced Materials* 2014, 26, 7386-7392.

[7] K. T. Braam, S. K. Volkman, V. Subramanian, *Journal of Power Sources* 2012, 199, 367-372.

[8] D. Chao, W. Zhou, C. Ye, Q. Zhang, Y. Chen, L. Gu, K. Davey, S. Z. Qiao, *Angewandte Chemie International Edition* 2019, 58, 7823-7828.

[9] X. Yu, S. Licht, *Journal of power sources* 2007, 171, 966-980.

[10] Y. Tian, H. Yue, Z. Gong, Y. Yang, *Electrochimica Acta* 2013, 90, 186-193.

[11] B. Xu, H. Lu, W. Cai, Y. Cao, Y. Deng, W. Yang, *Electrochimica Acta* 2019, 305, 360-369.

[12] H. Xiong, K. Yu, X. Yin, Y. Dai, Y. Yan, H. Zhu, *Journal of Alloys and Compounds* 2017, 708, 652-661.

[13] N. Xu, Y. Cai, L. Peng, J. Qiao, Y.-D. Wang, W. M. Chirdon, X.-D. Zhou, *Nanoscale* 2018, 10, 13626-13637.

[14] M. Mäntymäki, M. Ritala, M. Leskelä, *Coatings* 2018, 8, 277.

[15] L. Wang, Z. Wu, J. Zou, P. Gao, X. Niu, H. Li, L. Chen, *Joule* 2019, 3, 2086-2102.

[16] W. S. Hummers, R. E. Offeman, *Journal of the American Chemical Society* 1958, 80, 1339-1339.

As will be appreciated from the descriptions herein and the associated Figures, a wide variety of aspects and embodiments are contemplated by the present disclosure, examples of which include, without limitation, the aspects and embodiments listed below:

A method for producing a cathode active material, the method comprising: (i) mixing a first quantity of $CuSiF_6 \cdot 6H_2O$ with a second quantity of graphene oxide in an aqueous graphene oxide solution to provide an aqueous mixture; (ii) heating the aqueous mixture to produce a $CuSiF_6$/graphene oxide material; (iii) freeze drying the $CuSiF_6$/graphene oxide material; and (iv) after said freeze drying, heating the $CuSiF_6$/graphene oxide material under air flow to produce a cathode active material comprising a $CuF_2$-graphene nanocomposite.

A method in accordance with any other embodiment disclosed herein wherein the $CuSiF_6 \cdot 6H_2O$ is prepared by mixing copper oxide powder with fluorosilicic acid aqueous solution to provide a dispersion, heating and stirring the dispersion to produce $CuSiF_6 \cdot 6H_2O$, and filtering the $CuSiF_6 \cdot 6H_2O$ to provide a $CuSiF_6 \cdot 6H_2O$ filtrate.

A method in accordance with any other embodiment disclosed herein wherein the first quantity and the second quantity are present in the aqueous mixture at a ratio of from about 25:1 to about 10:1, by weight.

A method in accordance with any other embodiment disclosed herein wherein the first quantity and the second quantity are present in the aqueous mixture at a ratio of about 18:1, by weight.

A method in accordance with any other embodiment disclosed herein wherein heating the aqueous mixture comprises heating the aqueous mixture to a temperature of from about 160° C. to about 200° C.

A method in accordance with any other embodiment disclosed herein wherein the aqueous mixture is heated to a temperature of from about 160° C. to about 200° C. for at least 8 hours.

A method in accordance with any other embodiment disclosed herein wherein heating the aqueous mixture comprises heating the aqueous mixture to a temperature of about 180° C. for about 12 hours.

A method in accordance with any other embodiment disclosed herein wherein freeze drying the $CuSiF_6$/graphene oxide material comprises freeze drying the $CuSiF_6$/graphene oxide material at a temperature of from about −60° C. to about −100° C.

A method in accordance with any other embodiment disclosed herein wherein the CuSiF6/graphene oxide material is freeze dried at a temperature of from about −60° C. to about −100° C. for at least 36 hours.

A method in accordance with any other embodiment disclosed herein wherein freeze drying the $CuSiF_6$/graphene oxide material comprises freeze drying the $CuSiF_6$/graphene oxide material at a temperature of about −81° C. for about 3 days.

A method in accordance with any other embodiment disclosed herein wherein heating the $CuSiF_6$/graphene oxide material comprises heating the $CuSiF_6$/graphene oxide material to a temperature of from about 225° C. to about 275° C.

A method in accordance with any other embodiment disclosed herein wherein the $CuSiF_6$/graphene oxide material is heated to a temperature of from about 225° C. to about 275° C. for at least 1 hour.

A method in accordance with any other embodiment disclosed herein wherein heating the $CuSiF_6$/graphene oxide material comprises heating the $CuSiF_6$/graphene oxide material to a temperature of about 250° C. for about 2 hours.

A method for producing copper fluoride nanoparticles, the method comprising: (i) mixing copper oxide powder with fluorosilicic acid aqueous solution to provide a dispersion; (ii) heating and stirring the dispersion to produce $CuSiF_6 \cdot 6H_2O$; (iii) filtering the $CuSiF_6 \cdot 6H_2O$ to provide a damp $CuSiF_6 \cdot 6H_2O$ filtrate; (iv) freeze drying the damp $CuSiF_6 \cdot 6H_2O$ filtrate to provide a freeze dried sample; and (v) heating the freeze dried sample under air flow to produce $CuF_2$ nanoparticles.

A method in accordance with any other embodiment disclosed herein wherein heating and stirring the dispersion comprises heating the dispersion to a temperature of from about 50° C. to about 70° C.

A method in accordance with any other embodiment disclosed herein wherein the dispersion is heated to a temperature of from about 50° C. to about 70° C. for at least 12 hours.

A method in accordance with any other embodiment disclosed herein wherein heating the dispersion is heated to a temperature of about 60° C. for about 25 hours.

A method in accordance with any other embodiment disclosed herein wherein freeze drying the damp $CuSiF_6 \cdot 6H_2O$ filtrate comprises freeze drying the damp $CuSiF_6 \cdot 6H_2O$ filtrate under vacuum at a temperature of from about −60° C. to about −100° C.

A method in accordance with any other embodiment disclosed herein wherein the damp $CuSiF_6 \cdot 6H_2O$ filtrate is freeze dried under vacuum at a temperature of from about −60° C. to about −100° C. for at least 36 hours.

A method in accordance with any other embodiment disclosed herein wherein the damp $CuSiF_6 \cdot 6H_2O$ filtrate is freeze dried under vacuum at a temperature of about −81° C. for about 3 days.

A method in accordance with any other embodiment disclosed herein wherein heating the freeze dried sample comprises heating the freeze dried sample to a temperature of from about 225° C. to about 275° C.

A method in accordance with any other embodiment disclosed herein wherein the freeze dried sample is heated to a temperature of from about 225° C. to about 275° C. for at least 1 hour.

A method in accordance with any other embodiment disclosed herein wherein the freeze dried sample is heated to a temperature of about 250° C. for about 2 hours.

A cathode active material for a lithium-ion battery comprising a nanocomposite of graphene and copper fluoride.

A cathode active material in accordance with any other embodiment disclosed herein wherein the nanocomposite comprises copper fluoride-to-graphene bonding.

A cathode active material in accordance with any other embodiment disclosed herein wherein the cathode active material is made according to a method disclosed herein.

A cathode active material in accordance with any other embodiment disclosed herein wherein the cathode active material has a ratio of graphene to copper fluoride whereby graphene comprises from about 0.5 to about 30%, by weight, of the cathode active material.

A cathode active material in accordance with any other embodiment disclosed herein wherein the cathode active material has a ratio of graphene to copper fluoride whereby graphene comprises from about 2 to about 20%, by weight, of the cathode active material.

A cathode active material in accordance with any other embodiment disclosed herein wherein the cathode active material has a ratio of graphene to copper fluoride whereby graphene comprises from about 5 to about 15%, by weight, of the cathode active material.

A cathode active material in accordance with any other embodiment disclosed herein wherein the cathode active material has a specific capacity of at least 500 mAh/g and a working potential plateau of at least 2.5 V.

A cathode active material in accordance with any other embodiment disclosed herein wherein the cathode active material has a specific energy of at least 1400 Wh/kg.

A cathode for a lithium-ion battery comprising a cathode active material disclosed herein.

A cathode in accordance with any other embodiment disclosed herein wherein the cathode further comprises a polymeric binder material.

A cathode in accordance with any other embodiment disclosed herein wherein the polymeric binder comprises polyvinylidene difluoride.

A cathode in accordance with any other embodiment disclosed herein wherein the cathode further comprises a conductive additive.

A cathode in accordance with any other embodiment disclosed herein wherein the conductive additive is selected from the group consisting of carbon black, graphite, multi-walled carbon nanotubes and carbon fibers.

A cathode in accordance with any other embodiment disclosed herein wherein the conductive additive comprises carbon black.

A cathode in accordance with any other embodiment disclosed herein wherein the cathode comprises from about 75% to about 85% cathode active material, from about 8% to about 12% polymeric binder material and from about 8% to about 12% carbon black.

A cathode in accordance with any other embodiment disclosed herein wherein the cathode has a specific capacity of at least 500 mAh/g and a working potential plateau of at least 2.5 V.

A cathode in accordance with any other embodiment disclosed herein wherein the cathode has a specific energy of at least 1400 Wh/kg.

A cathode in accordance with any other embodiment disclosed herein wherein the cathode is configured for use in a primary lithium-ion battery.

A cathode in accordance with any other embodiment disclosed herein wherein the cathode is configured for use in a secondary lithium-ion battery.

A lithium-ion battery comprising a cathode, an anode, and an electrolyte, wherein the cathode is a cathode in accordance with any embodiment disclosed herein.

A battery in accordance with any other embodiment disclosed herein wherein the battery is a primary lithium-ion battery.

A battery in accordance with any other embodiment disclosed herein wherein the battery is a secondary lithium-ion battery.

While the disclosure has been illustrated and described in detail in the foregoing description and figures, the same is to be considered as exemplary and not restrictive in character, it being understood that only illustrative embodiments thereof have been shown and described and that all changes and modifications that come within the spirit of the disclosure are desired to be protected.

All publications, patents, and patent applications referenced herein are hereby incorporated by reference in their entirety for all purposes as if each publication, patent, or patent application had been individually indicated to be incorporated by reference.

What is claimed is:

1. A method of producing a cathode active material, the method comprising:
    mixing a first quantity of $CuSiF_6 \cdot 6H_2O$ with a second quantity of graphene oxide in an aqueous graphene oxide solution to provide an aqueous mixture;
    heating the aqueous mixture to produce a $CuSiF_6$/graphene oxide material;
    freeze drying the $CuSiF_6$/graphene oxide material; and
    after said freeze drying, heating the $CuSiF_6$/graphene oxide material under air flow to produce a cathode active material comprising a $CuF_2$-graphene nanocomposite.

2. The method according to claim 1 wherein the $CuSiF_6 \cdot 6H_2O$ is prepared by mixing copper oxide powder with fluorosilicic acid aqueous solution to provide a dispersion, heating and stirring the dispersion to produce $CuSiF_6 \cdot 6H2O$, and filtering the $CuSiF_6 \cdot 6H_2O$ to provide a $CuSiF_6 \cdot 6H_2O$ filtrate.

3. The method according to claim 1 wherein the first quantity and the second quantity are present in the aqueous mixture at a ratio of from about 25:1 to about 10:1, by weight.

4. The method according to claim 3 wherein the first quantity and the second quantity are present in the aqueous mixture at a ratio of about 18:1, by weight.

5. The method according to claim 1 wherein said heating the aqueous mixture comprises heating the aqueous mixture to a temperature of from about 160° C. to about 200° C.

6. The method according to claim 5 wherein the aqueous mixture is heated to a temperature of from about 160° C. to about 200° C. for at least 8 hours.

7. The method according to claim 5 wherein said heating the aqueous mixture comprises heating the aqueous mixture to a temperature of about 180° C. for about 12 hours.

8. The method according to claim 1 wherein said freeze drying the $CuSiF_6$/graphene oxide material comprises freeze drying the $CuSiF_6$/graphene oxide material at a temperature of from about −60° C. to about −100° C.

9. The method according to claim 8 wherein the $CuSiF_6$/graphene oxide material is freeze dried at a temperature of from about −60° C. to about −100° C. for at least 36 hours.

10. The method according to claim 8 wherein said freeze drying the $CuSiF_6$/graphene oxide material comprises freeze drying the $CuSiF_6$/graphene oxide material at a temperature of about −81° C. for about 3 days.

11. The method according to claim 1 wherein said heating the $CuSiF_6$/graphene oxide material comprises heating the $CuSiF_6$/graphene oxide material to a temperature of from about 225° C. to about 275° C.

12. The method according to claim 11 wherein the CuSiF$_6$/graphene oxide material is heated to a temperature of from about 225° C. to about 275° C. for at least 1 hour.

13. The method according to claim 11 wherein said heating the CuSiF$_6$/graphene oxide material comprises heating the CuSiF$_6$/graphene oxide material to a temperature of about 250° C. for about 2 hours.

* * * * *